(12) United States Patent
Nagase

(10) Patent No.: US 7,880,411 B2
(45) Date of Patent: Feb. 1, 2011

(54) MOTOR CONTROLLER OF ELECTRIC POWER STEERING DEVICE

(75) Inventor: Shigeki Nagase, Nabari (JP)

(73) Assignee: JTEKT Corporation, Osaki-shi (JP)

( * ) Notice: Subject to any disclaimer, the term of this patent is extended or adjusted under 35 U.S.C. 154(b) by 354 days.

(21) Appl. No.: 12/037,593

(22) Filed: Feb. 26, 2008

(65) Prior Publication Data

US 2008/0211441 A1    Sep. 4, 2008

(30) Foreign Application Priority Data

Mar. 2, 2007  (JP)  .............................. 2007-052263

(51) Int. Cl.
*H02P 1/00* (2006.01)

(52) U.S. Cl. ...................... 318/139; 180/2.1; 180/53.1; 180/214

(58) Field of Classification Search .................. 180/2.1, 180/214, 279, 53.1, 54.1, 65.1, 65.285, 65.26, 180/65.31, 65.29, 65.8, 428; 318/801, 811, 318/400.26, 727, 139, 550, 800, 803
See application file for complete search history.

(56) References Cited

U.S. PATENT DOCUMENTS

| | | | |
|---|---|---|---|
| 6,068,078 A | 5/2000 | Rau et al. | |
| 6,211,681 B1 * | 4/2001 | Kagawa et al. | ............... 324/426 |
| 6,737,822 B2 * | 5/2004 | King | ........................... 318/375 |
| 7,049,792 B2 * | 5/2006 | King | ........................... 320/126 |
| 7,224,146 B2 * | 5/2007 | Poore et al. | .................... 322/28 |
| 7,336,002 B2 * | 2/2008 | Kato et al. | ................. 307/10.6 |
| 7,420,295 B2 * | 9/2008 | Omae et al. | .................... 307/66 |
| 2006/0097577 A1 * | 5/2006 | Kato et al. | ................. 307/10.1 |
| 2009/0140673 A1 * | 6/2009 | Kasai et al. | ................. 318/139 |

FOREIGN PATENT DOCUMENTS

| | | |
|---|---|---|
| EP | 1 293 413 A2 | 3/2003 |
| EP | 1 900 602 A1 | 3/2008 |
| JP | 2006240531 | 9/2006 |
| JP | 2006-282121 | 10/2006 |
| WO | WO 2007/004357 A1 | 1/2007 |
| WO | WO2007004357 * | 1/2007 |

* cited by examiner

*Primary Examiner*—Bentsu Ro
*Assistant Examiner*—Antony M Paul
(74) *Attorney, Agent, or Firm*—Oblon, Spivak, McClelland, Maier & Neustadt, L.L.P.

(57) ABSTRACT

In a motor controller which supplies electric power to a motor of an electric power steering device from a main power supply and an auxiliary power supply, an N-channel MOS-FET is connected in parallel with a diode which is provided to prevent a sneak current from the auxiliary power supply to the main power supply. When electric power is supplied to the motor from the main power supply, the MOS-FET is turned on. Then, most of currents flow into the MOS-FET such that a power loss is reduced and a reduction in efficiency is prevented. The MOS-FET has high speed responsibility and excellent durability.

4 Claims, 3 Drawing Sheets

MOTOR CONTROLLER OF ELECTRIC POWER STEERING DEVICE

BACKGROUND OF THE INVENTION

1. Field of the Invention

The present invention relates to a motor controller of an electric power steering device which is mounted in vehicles such as automobiles.

2. Related Art

As a required steering assist force is increased, an electric power steering device needs to flow a high current into a motor. Electric power may be insufficient if it is supplied only from an in-vehicle battery. Therefore, although electric power is supplied from the in-vehicle battery as a main power supply normally, a terminal voltage of the main power supply may decrease due to an increase in load. In such a case, conventionally, there has been proposed a configuration in which electric power is supplied from an auxiliary power supply, which has previously stored electric power, such that the burden of the main power supply is reduced. (See JP-A-2006-282121.) In case that the auxiliary power supply is used, a diode is inserted into an electric path such that a current does not flow into the electric power steering device from the main power supply.

SUMMARY OF THE INVENTION

Recently, demand for an electric power steering device for large-size automobiles is increasing. To provide high power to such an electric power steering device, a configuration is proposed (Japanese Patent Application No. 2006-240531 filed by the present applicant), in which only a main power supply supplies electric power normally, and when larger electric power is required, the main power supply is connected in series to an auxiliary power supply such that electric power is supplied by both of the power supplies. In this case, when the auxiliary power supply is used, the voltage of a power supply electric path is higher than that of the main power supply. Therefore, a diode is provided to prevent the voltage from sneaking to the main power supply side.

In such configurations, however, when only the main power supply is used, a current supplied to a driving circuit of a motor flows through the diode in the forward direction. In this case, since a current value is large (several tens to more than 100 amperes), a voltage drop and a power loss in the diode significantly increase and the efficiency decreases. In addition, since the current value is large, the power supply voltage of the main power supply is reduced. Since a decrease in voltage occurs further in the diode, a voltage which is actually applied to the motor becomes low. Therefore, the output of the motor is reduced, and a reduction in assist force occurs, which may degrade a steering feeling. On the other hand, instead of the diode, a mechanical contact such as a relay that is opened and closed could be applied. However, the high speed responsibility and durability of such a mechanical contact may not be satisfactory.

In order to achieve the above-mentioned object, an advantage of the present invention is to provide a motor controller of an electric power steering device, which suppresses a reduction in efficiency and of which the high speed responsibility and durability are excellent.

According to an aspect of the invention, a motor controller of an electric power steering device includes a main power supply that supplies electric power to a motor of the electric power steering device; an auxiliary power supply that is able to supply electric power to the motor; a diode that is provided in an electric path through which electric power is supplied from the main power supply to the motor, the diode preventing a sneak current from the auxiliary power supply to the main power supply; a semiconductor switching element that is connected in parallel with the diode; and a control/driving circuit that turns on the semiconductor switching element when electric power is supplied from the main power supply to the motor, and turns off the semiconductor switching element when electric power is supplied to the motor by using the auxiliary power supply.

In the motor controller of the electric power steering device configured in such a manner, when electric power is supplied from only the main power supply, the semiconductor switching element is turned on and is connected in parallel with the diode. Accordingly, most of currents flowing from the main power supply to the motor flow into the semiconductor switching element of which the on-resistance is lower than the diode. Therefore, it is possible to prevent a decrease in voltage and a loss in electric power.

In the motor controller of the electric power steering device, the semiconductor switching element is an N-channel MOS-FET.

Since the on-resistance of the N-channel MOS-FET is small, the N-channel MOS-FET is suitable for reducing a power loss. Further, since various kinds of N-channel MOS-FETs are available, selection of the element is conducted easily, and the price thereof can be kept low.

In the motor controller of the electric power steering device, another semiconductor switching element is provided in an electric path through which electric power is supplied from the auxiliary power supply to the motor, and the control/driving circuit causes one of the semiconductor switching elements to gradually transit from the on-state to the off-state and causes the other to gradually transit from the off-state to the on-state, in accordance with PWM control.

In this case, the state inversion from the on-state to the off-state and the state inversion from the off-state to the on-state are gradually performed by the PWM control. Therefore, it is possible to prevent a rapid change in voltage when the power supplies are switched, thereby preventing a variation in torque of the motor.

In the motor controller of the electric power steering device, another semiconductor switching element is provided in an electric path through which electric power is supplied from the auxiliary power supply to the motor, and the control/driving circuit causes one of the semiconductor switching elements to transit from the on-state to the off-state and simultaneously causes the other to transit from the off-state to the on-state.

In this case, since both of the semiconductor switching elements are not turned on at the same time, it is possible to prevent a generation of circulation current which returns to the auxiliary power supply through the two semiconductor switching elements from the auxiliary power supply. Further, it is possible to prevent a loss caused by the circulation current.

According to the motor controller of the electric power steering device, since most of currents flowing from the main power supply to the motor flow into the semiconductor switching element, it is possible to reduce a power loss and to suppress a reduction in efficiency. Further, as the semiconductor switching element is used, the high speed responsibility and excellent durability thereof are excellent.

DETAILED DESCRIPTION OF THE PREFERRED EMBODIMENTS

Figure 1:
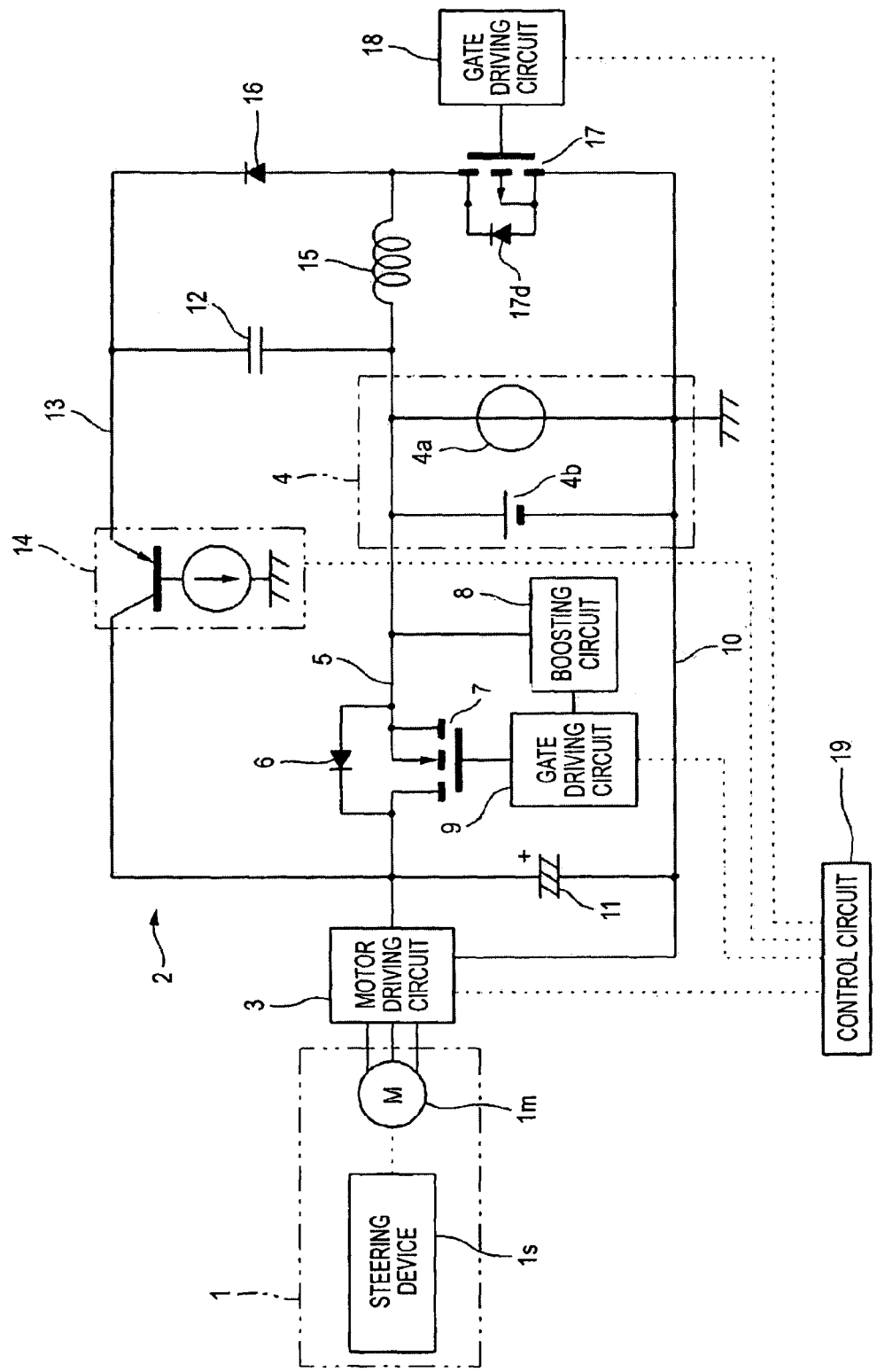
FIG. 1 is a circuit diagram of a motor controller of an electric power steering device according to a first embodiment of the invention.

FIG. 1 is a circuit diagram showing a motor controller 2 of an electric power steering device 1 according to a first embodiment of the invention. In FIG. 1, a steering assist force is applied to a steering device is of a vehicle by a motor 1m, and a motor driving circuit 3 supplies power to the motor 1m. A main power supply 4 is composed of an in-vehicle battery 4b and an alternator 4a. In the middle of a non-ground-side electric path 5 leading the main power supply 4 to the motor driving circuit 3, a diode 6 is disposed so as to set the direction from the main power supply 4 to the motor driving circuit 3 as forward direction.

Further, an N-channel MOS-FET 7 serving as a semiconductor switching element is connected in parallel with the diode 6, such that the N-channel MOS-FET has a source connected to the side of the main power supply 4 and a drain connected to the side of the motor driving circuit 3. The source of the MOS-FET 7 is connected to a boosting circuit (bootstrap circuit) 8 for gate drive. Based on an output voltage from the boosting circuit, a gate voltage is applied through a gate driving circuit 9. Between the drain of the MOS-FET 7 and a ground-side electric path 10, an electrolytic capacitor 11 for smoothing is provided.

Meanwhile, an auxiliary power supply 12 is composed of an electric double layer capacitor or a lithium ion battery and is connected in series to the main power supply 4. A power feeding electric path (high-potential-side electric path) 13 of the auxiliary power supply 12 is connected to the drain of the MOS-FET 7 and the motor driving circuit 3 through a discharge control circuit (constant current source) 14. The low-potential side of the auxiliary power supply 12 is connected to an anode of the diode 16 through a reactor 15, and a cathode of the diode 16 is connected to the power feeding electric path 13 of the auxiliary power supply 12. Between the anode of the diode 16 and the ground-side electric path 10, a P-channel MOS-FET 17 is provided. A diode 17d for protection is connected in parallel with or built in the MOS-FET 17. The gate of the MOS-FET 17 is driven by the gate driving circuit 18.

The motor driving circuit 3, the gate driving circuit 9, the discharge control circuit 14, and the gate driving circuit 18 are operated in accordance with an instruction signal received from the control circuit 19. The control circuit 19 is set to receive steering torque of a steering wheel by a driver and vehicle speed information. Further, the control circuit 19 drives the motor 1m to generate a proper steering assistant force depending on the information.

When the MOS-FET 17 is turned on, a current flows through the reactor 15 and the MOS-FET 17 from the alternator 4a. On the other hand, when the MOS-FET 17 is switched into an off-state, a high voltage is generated in the reactor 15 to prevent a change in magnetic flux caused by current interruption. Accordingly, the auxiliary power supply 12 is charged with a voltage boosting an output of the alternator 4a. As the turn-on/off of the MOS-FET 17 is repeated, the auxiliary power supply 12 can be charged.

In above-described configuration, when a required steering assist force is relatively small, the control circuit 19 turns on the MOS-FET 7 and turns off the discharge control circuit 14. Accordingly, the voltage of the main power supply 4 is smoothed by the smoothing capacitor 11 and is then supplied to the motor driving circuit 3. The motor driving circuit 3 drives the motor 1m on the basis of a control signal from the control circuit 19. Meanwhile, the voltage of the auxiliary power supply 12 is not supplied to the motor driving circuit 3. Here, the on-resistance of the N-channel MOS-FET is much smaller (for example, about 1 mΩ) than the forward resistance of the diode 6. Therefore, most of currents flowing from the main power supply 4 to the motor driving circuit 3 flow through the MOS-FET 7. Accordingly, a power loss in the MOS-FET 7 is small so as to suppress a reduction in efficiency. Further, since the MOS-FET 7 is a semiconductor switch element, the high speed responsibility and excellent durability thereof are provided.

Meanwhile, when a required steering assist force is relatively large and cannot be covered only by the main power supply 4, the control circuit 19 turns off the MOS-FET 7 and turns on the discharge control circuit 14. As a result, the main power supply 4 and the auxiliary power supply 12 are connected in series to each other. Based on the voltage of the main power supply 4 and the auxiliary power supply 12, a current defined by a constant current source of the discharge control circuit 14 is supplied to the motor driving circuit 3. Accordingly, electric power exceeding electric power which can be output from the main power supply 4 is supplied to the motor driving circuit 3. At this time, as the cathode of the diode 6 has a higher potential than the anode thereof, that is, the diode 6 has an inverse voltage, it is possible to prevent a sneak current from the auxiliary power supply 12 to the main power supply 4.

The discharge control circuit 14 according to this embodiment may be changed into a PWM voltage source (which PWM-controls a gate voltage of a MOS-FET).

As described above, the MOS-FET 7 according to this embodiment is an N-channel MOS-FET. Further, since the on-resistance of the N-channel MOS-FET is small, the N-channel MOS-FET is suitable for the above-described uses. Further, since there are various kinds of N-channel MOS-FETs, selection is easy, and the price of the N-channel MOS-FET is low. Although a P-channel MOS-FET can be used, there is no P-channel MOS-FET which has on-resistance as small as that of the N-channel MOS-FET, and the chip size of the P-channel MOS-FET is large. Therefore, the N-channel MOS-FET is practically used.

Figure 2:
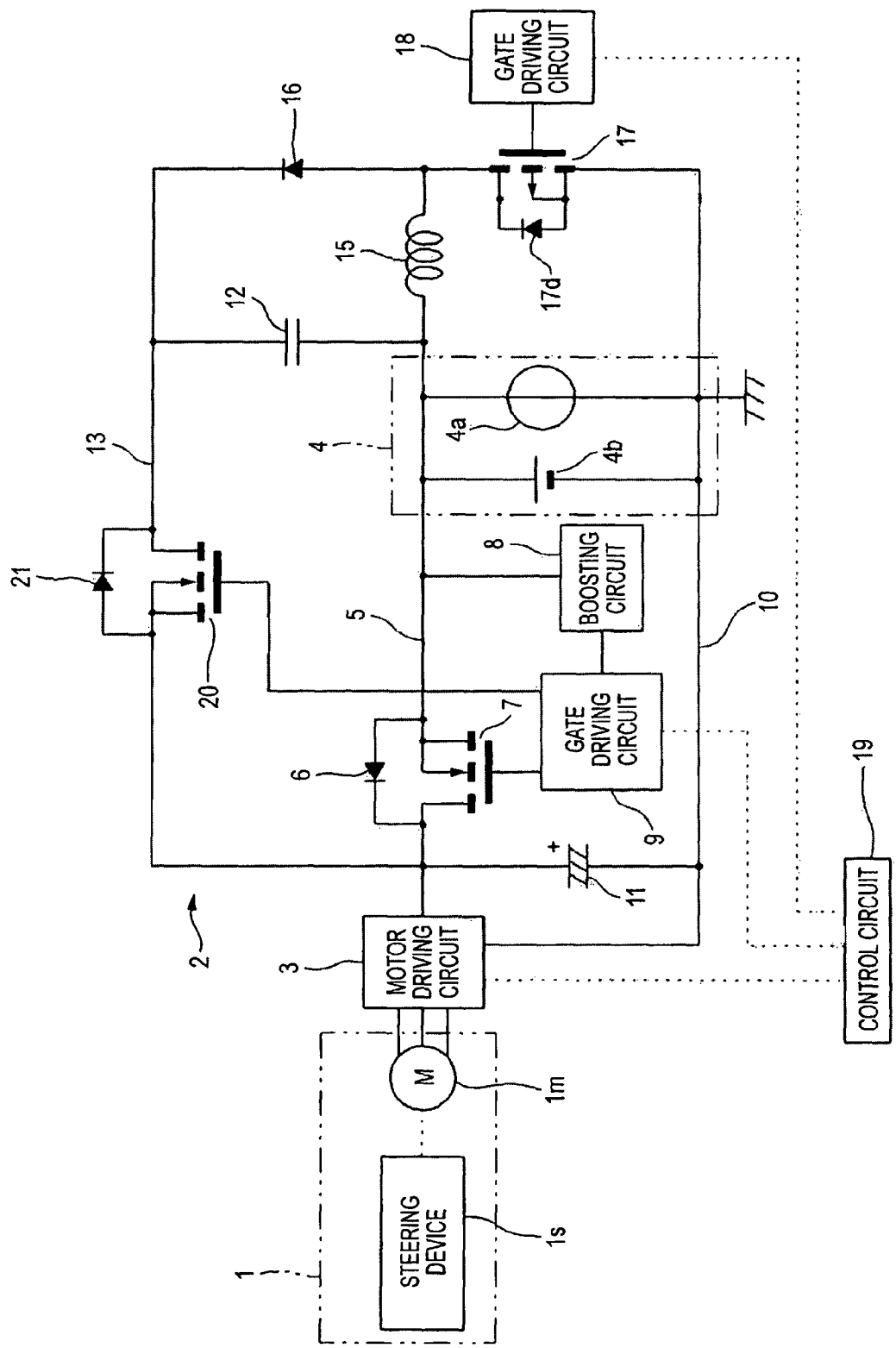
FIG. 2 is a circuit diagram of a motor controller of an electric power steering device according to a second embodiment of the invention.

FIG. 2 is a circuit diagram of a motor controller 2 of an electric power steering device 1 according to a second embodiment of the invention. The motor controller of FIG. 2 is different from that of FIG. 1 in that the one in which an N-channel MOS-FET 20 for controlling discharge and a diode 21 are connected in parallel with each other is provided in the power feeding electric path 13 of the auxiliary power supply 12 as shown in the drawing, and a gate is driven by a gate driving circuit 9 with respect to the MOS-FET 20. The other components are the same as those of the first embodiment.

In the above-described configuration (FIG. 2), when a required steering assist force is relatively small, the control circuit 19 turns on the MOS-FET 7 and turns off the MOS-FET 20. Accordingly, the voltage of the main power supply 4 is smoothed by the smoothing capacitor 11 and is then supplied to the motor driving circuit 3. Further, the motor driving circuit 3 drives the motor 1m on the basis of a control signal from the control circuit 19. Similar to the first embodiment, the on-resistance of the N-channel MOS-FET 7 is much smaller than the forward resistance of the diode 6. Therefore, most of currents flowing from the main power supply 4 to the motor driving circuit 3 flow into the MOS-FET 7. Accordingly, a power loss in the MOS-FET 7 is small so as to control a reduction in efficiency. Further, since the MOS-FET 7 is a semiconductor switching element, the high speed responsibility and durability thereof are excellent. Meanwhile, since the auxiliary-power-source-side MOS-FET 20 is turned off and the diode 21 has an inverse voltage, electric power is supplied from the auxiliary power supply 12 to the motor driving circuit 3.

Figure 3:
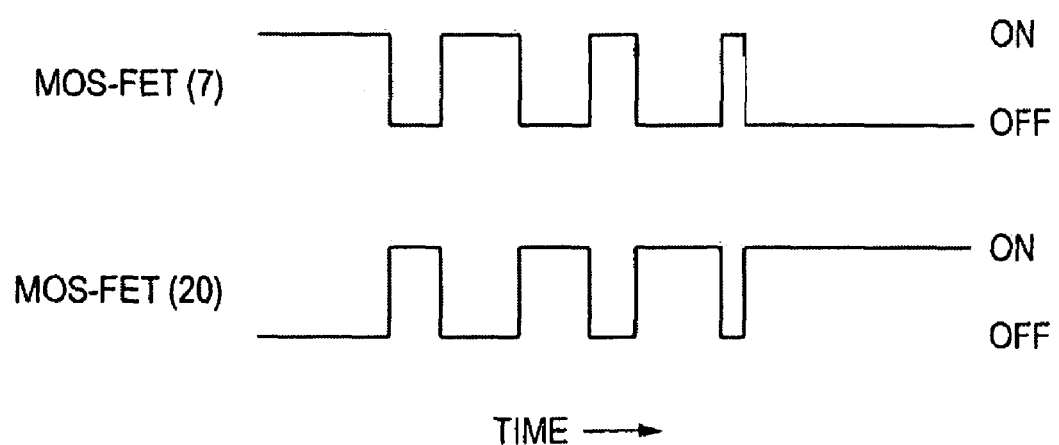
FIG. 3 is a diagram showing changes in on/off state when switching is performed by PWM control in two MOS-FETs in a power supply electric path of FIG. 2.

When a required steering assist force is relatively large and cannot be covered by only the main power supply 4, the control circuit 19 inverses the states of two MOS-FETs 7 and 20 so as to turn off the MOS-FET 7 and turn on the MOS-FET 20. At this time, the states are not inversed in a moment. As shown in FIG. 3, however, the MOS-FET 7 gradually transits from the on-state to the off-state and the MOS-FET 20 gradually transits from the off-state to the on-state, in accordance with the PWM control of the gate driving circuit 9. Further, in such a transient state, the states of both the MOS-FETs 7 and 20 are always in inverse relation to each other.

When the inversion is completed, the voltage of the main power supply 4 and the auxiliary power supply 12 is supplied to the motor driving circuit 3 through the MOS-FET 20, in a state where the main power supply 4 and the auxiliary power supply 12 are connected in series to each other. Accordingly, electric power exceeding electric power which can be output from the main power supply 4 can be supplied to the motor driving circuit 3. As described above, since the on-resistance of the N-channel MOS-FET 20 is small, a power loss in the MOS-FET 20 is small so as to suppress a reduction in efficiency when the auxiliary power supply 12 is used. Further, since the diode 6 has an inverse voltage, a current is prevented from sneaking from the auxiliary power supply 12 to the main power supply 4.

Further, as the state inversion of the MOS-FETs 7 and 20 is gradually performed, a rapid change in voltage can be controlled during the power supply switching, and a variation in torque of the motor 1m can be prevented. Further, both of the MOS-FETs 7 and 20 are not turned on at the same time. Therefore, it is possible to prevent a circulation current from being generated, the circulation current returning to the auxiliary power supply 12 through the two MOS-FETs 7 and 20 from the auxiliary power supply 12.

Further, the re-inversing operation for turning off the MOS-FET 7 and turning on the MOS-FET 20 is performed in the same manner.

In the respective embodiments, the MOS-FETs 7 and 20 have been used as semiconductor switching elements which are provided in the non-ground-side electric path 5 of the main power supply 4 and the power feeding electric path 13 of the auxiliary power supply 12, respectively. In addition to the MOS-FET, however, other semiconductor switching elements (for example, BJT and IGBT) may be used, if they have low on-resistance.

What is claimed is:

1. A motor controller of an electric power steering device, the motor controller comprising:
   a main power supply that supplies electric power to a motor of the electric power steering device;
   an auxiliary power supply connectable in series with the main power supply to supplement the voltage of the electric power supplied to the motor by the main power supply;
   a diode that is provided in an electric path through which electric power is supplied from the main power supply to the motor, the diode preventing a sneak current from the auxiliary power supply to the main power supply;
   a semiconductor switching element that is connected in parallel with the diode; and
   a control/driving circuit that turns on the semiconductor switching element when electric power is supplied from the main power supply to the motor, and turns off the semiconductor switching element when electric power supplied to the motor is supplemented with the auxiliary power supply.

2. The motor controller according to claim 1, wherein the semiconductor switching element is an N-channel MOS-FET.

3. The motor controller according to claim 1, wherein another semiconductor switching element is provided in an electric path through which electric power is supplied from the auxiliary power supply to the motor, and the control/driving circuit causes one of the semiconductor switching elements to gradually transit from the on-state to the off-state and causes the other to gradually transit from the off-state to the on-state, in accordance with PWM control.

4. The motor controller according to claim 1, wherein another semiconductor switching element is provided in an electric path through which electric power is supplied from the auxiliary power supply to the motor, and the control/driving circuit causes one of the semiconductor switching elements to transit from the on-state to the off-state and simultaneously causes the other to transit from the off-state to the on-state.

* * * * *